(12) United States Patent
Becker et al.

(10) Patent No.: US 7,353,221 B1
(45) Date of Patent: Apr. 1, 2008

(54) METHOD FOR THE AUTOMATIC RETRIEVAL OF ENGINEERING DATA OF SYSTEMS

(75) Inventors: Norbert Becker, Erlangen (DE); Georg Biehler, Nürnberg (DE); Matthias Diezel, Laufamholz (DE); Albrecht Donner, Markersdorf (DE); Dieter Eckardt, Herzogenaurach (DE); Manfred Krämer, Wendelstein (DE); Dirk Langkafel, Effeltrich (DE); Ralf Leins, Ispringen (DE); Ronald Lange, Fürth (DE); Karsten Schneider, Erlangen (DE); Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,995

(22) PCT Filed: Mar. 9, 2000

(86) PCT No.: PCT/DE00/00735

§ 371 (c)(1),
(2), (4) Date: Jan. 18, 2002

(87) PCT Pub. No.: WO00/54188

PCT Pub. Date: Sep. 14, 2000

(30) Foreign Application Priority Data

Mar. 9, 2000 (DE) ................................ 199 10 535

(51) Int. Cl.
*G06F 17/00* (2006.01)
*G06F 19/00* (2006.01)

(52) U.S. Cl. .............................. 707/3; 703/4; 703/100; 703/102; 703/103 R; 700/96; 700/97; 700/104; 711/1; 711/2; 711/3

(58) Field of Classification Search ................ 707/1–6, 707/112, 100–104.1, 200–202 R; 717/104–121, 717/1, 5, 6; 700/8, 17, 83, 96–97, 105, 9, 700/104, 275; 719/310, 331; 711/1–3
See application file for complete search history.

(56) References Cited

U.S. PATENT DOCUMENTS

| | | | | |
|---|---|---|---|---|
| 4,885,694 A | * | 12/1989 | Pray et al. ................... | 705/400 |
| 5,437,027 A | * | 7/1995 | Bannon et al. .......... | 707/103 R |
| 5,557,773 A | * | 9/1996 | Wang et al. .................... | 707/3 |
| 5,680,613 A | * | 10/1997 | Atsumi ................... | 707/103 R |

(Continued)

OTHER PUBLICATIONS

"How to Identify Binary Relations for Domain Models"—Hermann Kaindl—1996 IEEE, Proceedings of ICSE-18 (pp. 28-36).*

(Continued)

*Primary Examiner*—John Breene
*Assistant Examiner*—Anh Ly
(74) *Attorney, Agent, or Firm*—Harness, Dickey & Pierce, P.L.C.

(57) ABSTRACT

The invention relates to a method for the automatic retrieval of engineering data from installations. The engineering and runtime objects are described by a uniform object model. This allows the correspondence between engineering objects and runtime objects to be determined at object level and no information is lost as a result of the mapping. In addition, a direct communication between engineering and runtime objects can take place, which can be utilized when the method is carried out.

12 Claims, 4 Drawing Sheets

U.S. PATENT DOCUMENTS

| | | | |
|---|---|---|---|
| 5,901,058 A * | 5/1999 | Steinman et al. | 700/1 |
| 5,987,242 A * | 11/1999 | Bentley et al. | 703/13 |
| 5,995,969 A * | 11/1999 | Lee et al. | 707/102 |
| 6,055,541 A * | 4/2000 | Solecki et al. | 707/103 R |
| 6,059,838 A * | 5/2000 | Fraley et al. | 717/108 |
| 6,063,128 A * | 5/2000 | Bentley et al. | 703/6 |
| 6,100,964 A * | 8/2000 | De Cremiers | 382/104 |
| 6,119,125 A * | 9/2000 | Gloudeman et al. | 707/103 R |
| 6,141,595 A * | 10/2000 | Gloudeman et al. | 700/83 |
| 6,169,993 B1 * | 1/2001 | Shutt et al. | 707/103 R |
| 6,263,492 B1 * | 7/2001 | Fraley et al. | 717/107 |
| 6,339,776 B2 * | 1/2002 | Dayani-Fard et al. | 707/102 |
| 6,421,571 B1 * | 7/2002 | Spriggs et al. | 700/17 |
| 6,425,017 B1 * | 7/2002 | Dievendorff et al. | 719/315 |
| 6,499,137 B1 * | 12/2002 | Hunt | 717/164 |
| 6,505,204 B1 * | 1/2003 | Fanjoy | 707/100 |
| 6,567,819 B1 * | 5/2003 | Cheng et al. | 707/101 |
| 6,581,048 B1 * | 6/2003 | Werbos | 706/23 |
| 6,600,964 B2 * | 7/2003 | Hess et al. | 700/97 |
| 6,631,521 B1 * | 10/2003 | Curtis | 717/175 |
| 6,701,325 B2 * | 3/2004 | Becker et al. | 707/104.1 |
| 6,757,568 B2 * | 6/2004 | Birzer et al. | 700/18 |
| 6,775,576 B2 * | 8/2004 | Richetta et al. | 700/8 |
| 6,779,174 B2 * | 8/2004 | Amrhein et al. | 717/131 |
| 6,834,209 B2 * | 12/2004 | Potz et al. | 700/97 |
| 6,859,668 B1 * | 2/2005 | Ginzburg et al. | 700/19 |
| 6,889,097 B2 * | 5/2005 | Kiesel et al. | 700/18 |
| 6,965,803 B2 * | 11/2005 | Bungert et al. | 700/83 |
| 6,993,409 B2 * | 1/2006 | Jartyn | 700/169 |
| 7,107,523 B2 * | 9/2006 | Bussert et al. | 715/513 |
| 7,114,155 B2 * | 9/2006 | Stripf et al. | 700/18 |
| 7,181,301 B2 * | 2/2007 | Becker et al. | 700/95 |
| 7,185,129 B2 * | 2/2007 | Becker et al. | 709/208 |
| 2001/0037161 A1 * | 11/2001 | Hess et al. | 700/96 |
| 2001/0042067 A1 * | 11/2001 | Dayani-Fard et al. | 707/102 |
| 2002/0072819 A1 * | 6/2002 | Becker et al. | 700/95 |
| 2002/0196285 A1 * | 12/2002 | Sojoodi et al. | 345/771 |
| 2004/0210850 A1 * | 10/2004 | Bermudez et al. | 715/848 |
| 2005/0159932 A1 * | 7/2005 | Thurner | 703/2 |
| 2005/0183094 A1 * | 8/2005 | Hunt | 719/315 |

OTHER PUBLICATIONS

"SIMOO-RT—An Object-Oriented Framework for the Development for real-Time Industrial Automation Systems"—Leandro B. Becker and Carlos E. Pereira—2002 IEEE (pp. 421-430).*

"Object Database Support for a Software Project ManagementEnvironment"—Lung-Chun Liu and Ellis Horowitz 1998 ACM (pp. 85-96).*

Elmqvist, Advances in Instrumentation and Control, vol. 46, part 2, pp. 1599-1608, (1991) "A Uniform Architecture for Distributed Automation" (Hilding Elmqvist).

* cited by examiner

METHOD FOR THE AUTOMATIC RETRIEVAL OF ENGINEERING DATA OF SYSTEMS

This application is the national phase under 35 U.S.C. § 371 of PCT International Application No. PCT/DE00/00735 which has an International filing date of Mar. 9, 2000, which designated the United States of America, the entire contents of which are hereby incorporated by reference.

FIELD OF THE INVENTION

The invention relates to a method for the automatic retrieval of engineering data from installations.

BACKGROUND OF THE INVENTION

An automation system of this type is used in particular in the area of automation technology. An automation system of this type generally comprises a multiplicity of individual automation objects, which are frequently highly dependent on the engineering system respectively used.

At present there are two basic methods in use. In the first method, the retrieval of the engineering data from the installation is ruled out. Changes to the installation are possible only via the engineering tool. Consequently, the data in the engineering system always reflect the current state and there is no need for information to be reproduced from the installation. This solution has the following disadvantages:

- Strong link between runtime and engineering: The engineering system must be supplied along with the installation and also be additionally paid for by the customer.
- Changes in the installation cannot be reproduced: If there are changes in the installation, for example as a result of a device being exchanged, these changes cannot be automatically reproduced in the engineering system.
- High organizational expenditure: To keep the engineering data up to date, organizational precautions have to be taken to ensure the way in which changes in the installation are introduced into the engineering system.

The second approach is based on a disassembly of the runtime code. In this case, the executable code of the runtime objects is analyzed and translated into the engineering counterparts. This solution has the following disadvantages:

- Elaborate method: The analysis of the runtime code is complex and susceptible to errors.
- Implementation-dependent: The implementation of the translation back is strongly dependent on how the translation process is carried out. Changes to the translation process and in particular the code created necessitate adaptation of the implementation of the translating-back process.
- ES information can no longer be produced with certainty: Since the runtime code is at a semantically lower level than the actual engineering information, it cannot be ensured that the engineering information can be exactly reconstructed.

In the specialist article Elmqvist, H.: "A Uniform Architecture for Distributed Automation", Advances in Instrumentation and Control, vol. 46, part 2, 1991, pages 1599-1608, XP000347589 Research Triangle Park, N.C., US, a description is given of an automation system whose objects are programmed in an object- and data-flow-oriented programming language. It uses a graphic programming environment and offers means for the creation of dynamically updated process images. The programming language allows an automatic communication between distributed objects.

SUMMARY OF THE INVENTION

One problem underlying the invention is that of allowing the information contained in an installation to be automatically reproduced in an engineering system and used again there, for example to plan changes in the installation.

An object of the invention is to solve that and/or other problems by a method and by a system with the features specified in claims 1 and 8, respectively.

In this case, the engineering and runtime objects are described by a uniform object model. As a result, the correspondence between engineering objects and runtime objects can be determined at the object level and no information is lost as a result of the mapping. In addition, a direct communication between engineering and runtime objects can take place, which can be utilized when the method is carried out.

The relationship between an engineering object and its runtime counterpart is described in FIG. 1. The engineering object ESO has a direct reference, RTO ref, to its runtime counterpart RTO. This is possible since the runtime objects are available (or become available) at the time of engineering. The runtime object RTO has no direct reference to the associated engineering object. This is necessary to make it possible for the engineering system and runtime system to be separated. Instead of this, the object RTO contains an identifying designation, ESO type ID, referring to the type of engineering object, ESO type. Consequently, required instances of the ESO type can then be created by the RTO.

With respect to a runtime object RTO, the method for the restoration of engineering information proceeds as follows:

1. If a runtime object receives the order to retrieve its engineering information, it firstly addresses the type of its engineering object with the order to create a new instance of an engineering object.
2. In the newly created instance, the runtime object enters a reference to itself and orders the new engineering object to read out its data (that of the runtime object).
3. The new engineering object then reads out the information from the runtime object and enters the corresponding engineering information in itself.

BRIEF DESCRIPTION OF THE DRAWINGS

The invention is described and explained in more detail below on the basis of the exemplary embodiments represented in the figures, in which.

DETAILED DESCRIPTION OF THE PREFERRED EMBODIMENTS

The method for the retrieval of engineering information from the installation preferably proceeds in three steps:

Restoration of the device representatives;

Restoration of the representatives of the automation objects in the engineering; and Restoration of the communication relationships between the representatives of the automation objects.

The method is described below for the complete retrieval of the engineering information. However, it can equally be used for updating already existing engineering information, i.e. as a delta method. Hereafter, the overall method is referred to as upload.

Figure 1:
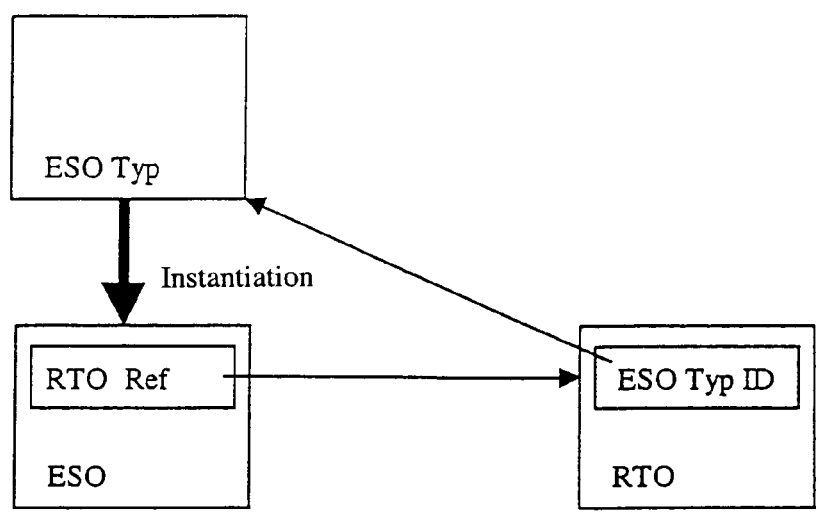
FIG. 1 shows an overview to identify the relationships between engineering objects and runtime objects.
Figure 2:
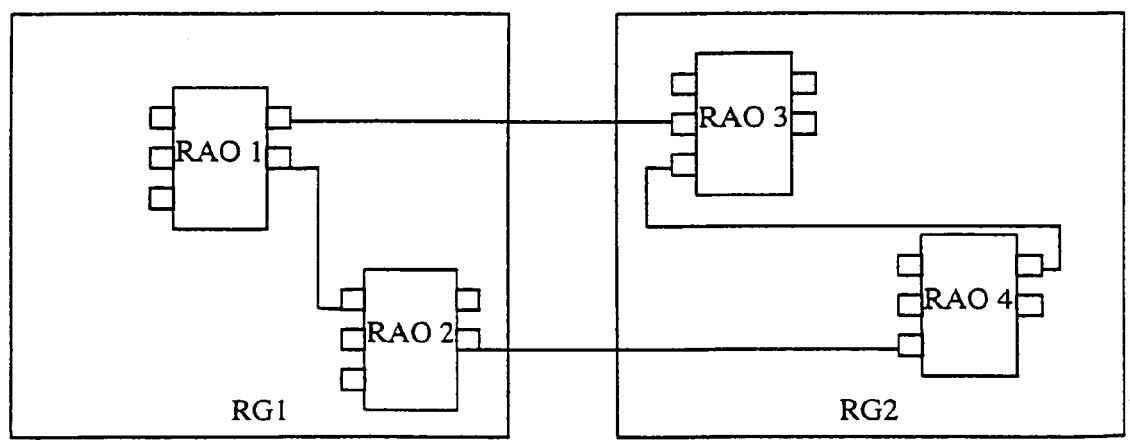
FIG. 2 shows a view of an object of an installation by way of example.

In FIG. 2, the objects involved are listed by way of example. Two automation objects run on each of the two devices RG1 and RG2. The automation objects RAO1 and RAO2 run on RG1, RAO3 and RAO4 run on RG2. Communication connections are symbolized by lines. Thus, altogether two device-internal and two device-interlinking communication relationships exist.

1. Restoration of the Device Representatives

The beginning of the upload is initiated from a software system. This may be an engineering system or any other desired system which requires engineering information. One example of this is a system for parameterizing the installation. For the sake of simplicity, hereafter reference is always made to an engineering system.

In the first step, all the devices are requested to create their representation in the engineering. For this purpose, each device returns an identifier of the type of its engineering counterpart. The engineering system then creates the corresponding objects and enters the reference to the actual device in each device representative. By means of the reference, each device representative then reads out the relevant data of "its" device.

Figure 3:
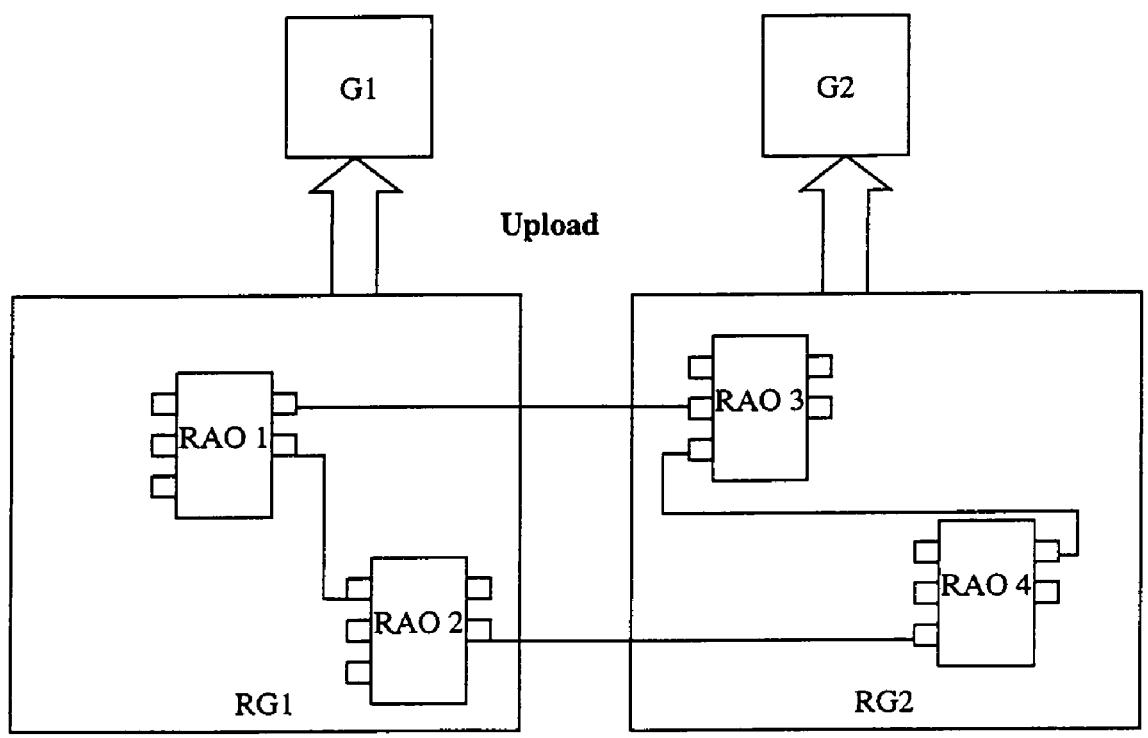
FIG. 3 shows an illustration of the creation of device representatives in the engineering.

FIG. 3 illustrates what has just been described. The devices of the installation, here RG1 and RG2, receive the request to upload through the engineering system. They then in each case return the identifiers of the types of the engineering representatives. The engineering system creates the instances G1 and G2 for the corresponding types. These then read out the relevant engineering information from the devices RG1 and RG2.

2. Restoration of the Automation Objects in the Engineering

In the second step, the representatives of the automation objects are created in the engineering. Via the device assigned to it, each device representative requests the automation objects of its device to create its counterparts in the engineering. For this purpose, each automation object returns the identifier of the type of its engineering representative. In the engineering system, the corresponding objects are then again created and provided with a reference to their partner in the runtime environment. After that, each automation object in the engineering inquires the relevant data of its partner.

Figure 4:
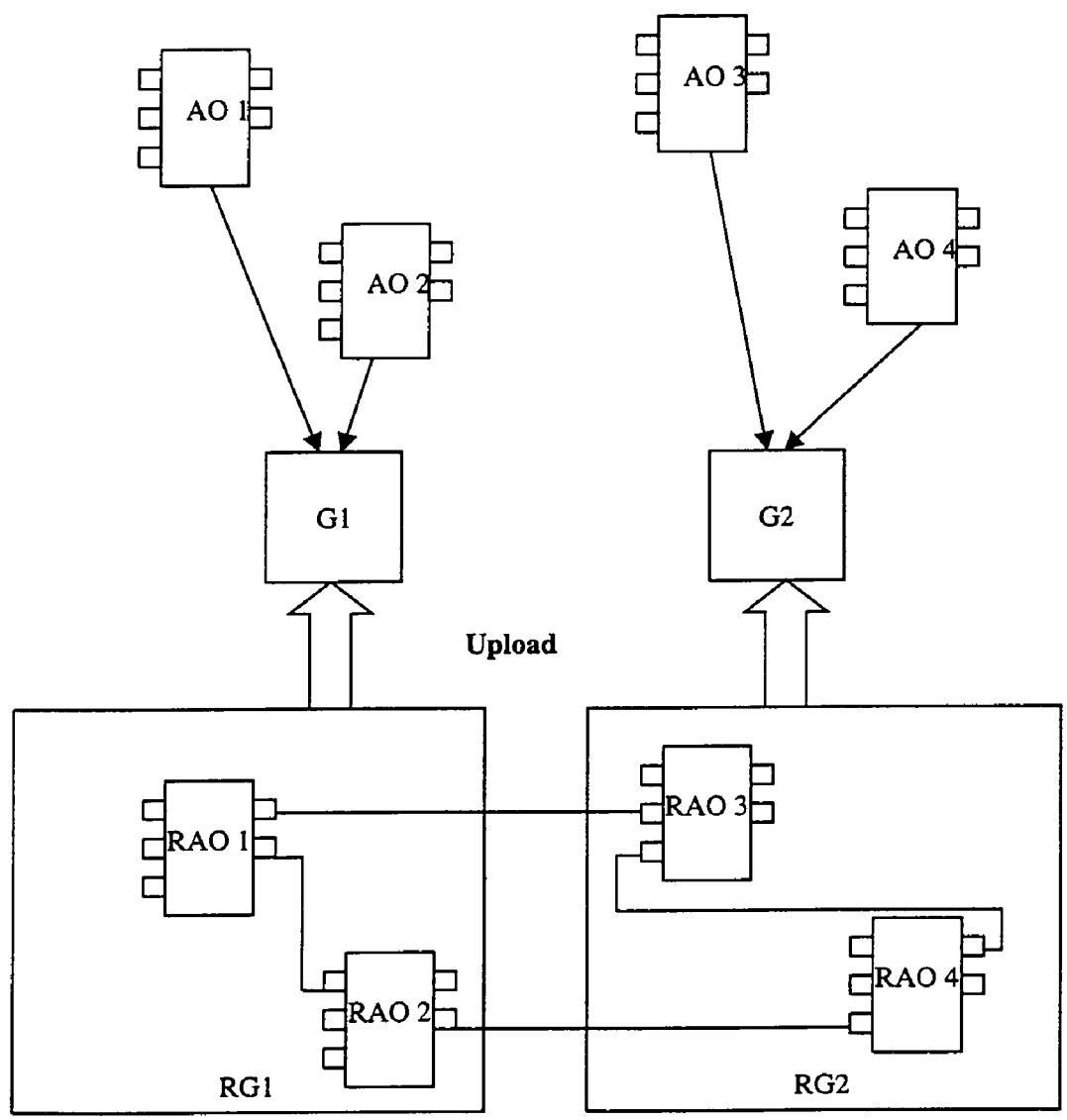
FIG. 4 shows a representation of the creation of the automation objects in the device representatives by way of example and FIG. 5 shows a layout of the existing communication relationships in the engineering.

The result of this operation can be seen in FIG. 4. The representative G1 inquires from the device RG1 the automation objects RAO1 and RAO2. These are then requested to upload by G1 and return the identifiers of the types of AO1 and AO2. By means of this information, the instances AO1 and AO2 are created in the engineering. These then receive a reference to their runtime counterparts RAO1 and RAO2 are finally assigned to the device representative G1. As a result, the information on the device assignment of the automation objects is available again. Subsequently, AO1 and AO2 read out the information relevant for engineering from RAO1 and RAO2.

3. Restoration of the Communication Relationships Between the Automation Objects in the Engineering In the third step, the communication relationships between the automation objects are restored. For this purpose, each device representative asks the device assigned to it for its communication relationships. The device then returns a list with both the device-internal and device-interlinking communication relationships. An entry of this list comprises the source and drain of the communication relationship. The source and drain are in each case described by a 3-tuple from the identifier of the physical device, the identifier of the automation object and the identifier of the input or output.

In the engineering system, the entries of the list are converted into references to the inputs and outputs of the representatives of the automation objects. For this purpose, the information from the already created objects (the references of the engineering representatives to their runtime counterparts) is used. Subsequently, the connection in the engineering system is then set up.

An efficient way of carrying out the step will ensure that the list with communication connections created by each device only contains those in which the device appears in the identifier of the source (alternatively of the drain). Furthermore, an effective method will buffer-store the relationships between engineering representatives and runtime counterparts set up in steps 1 and 2, in order in this way to minimize the searching effort in step 3.

Figure 5:
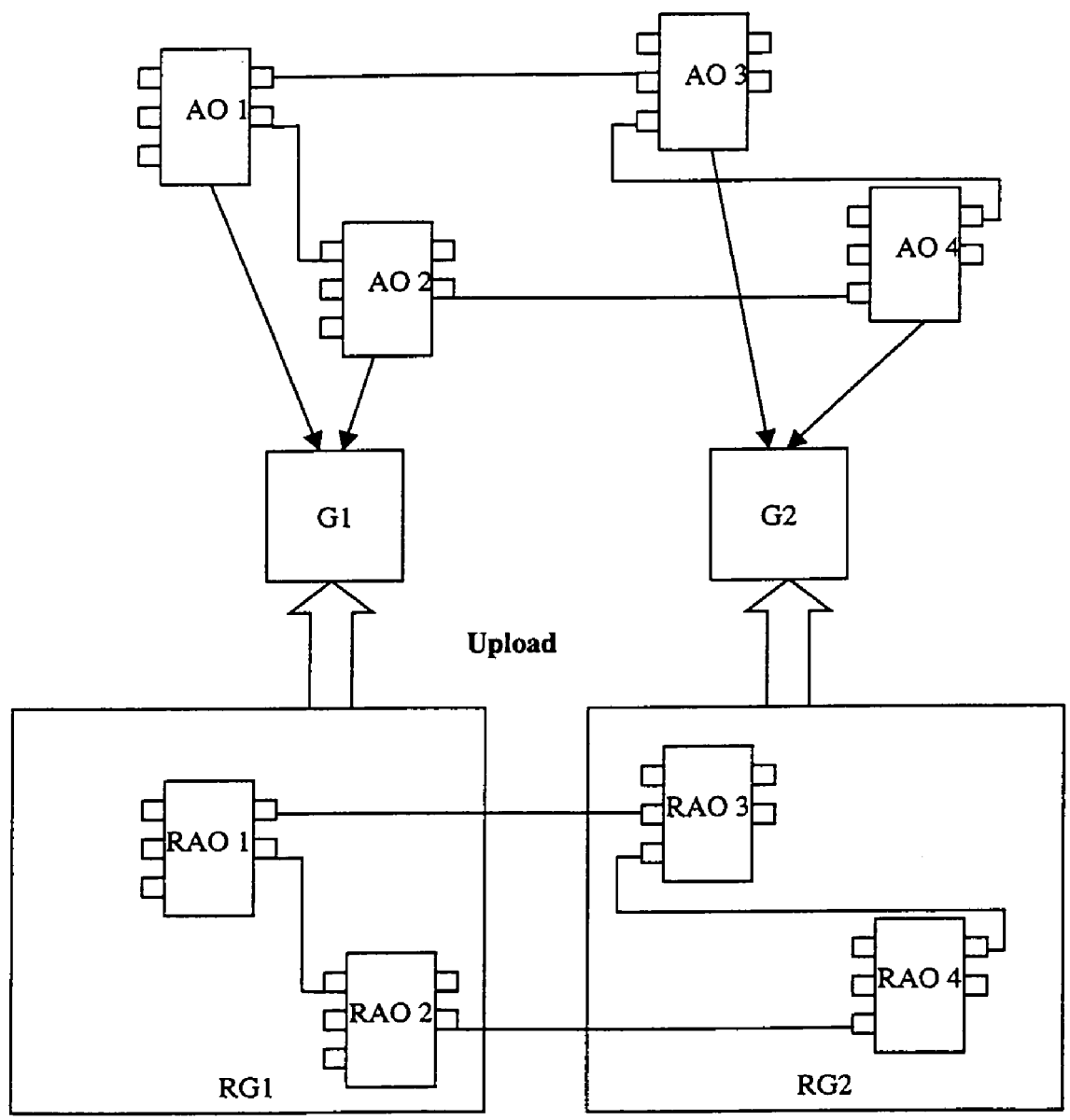

FIG. 5 then shows the result of the last step. G1 has inquired the communication relationships from RG1. In response, the relationships between RAO1 and RAO2, RAO1 and RAO3 and between RAO2 and RAO4 were returned. The connections are then converted in the engineering, for example the connection between RAO1 and RAO3 is converted to the connection between AO1 and AO3.

Both the objects of the engineering system and of the runtime system are based on the same, executable object model. The use of the same model makes possible a direct interaction at model level (data exchange and communication) between the engineering objects and runtime objects. Furthermore, a unique mapping, which is independent of the implementation of the objects, is defined by the defined assignment between the engineering and runtime objects.

This gives rise to advantages for the method, including but not limited to:

Separation of engineering and runtime possible: Changes do not necessarily have to be carried out with the engineering tool. If need be, the changes can be introduced into the engineering system at any time.

Simple method: By determining the method at the level of explicit models, the method can be described in general terms and so becomes more reliable.

Simple and complete mapping: There is a defined relationship between the runtime and engineering objects, making complete restoration of the engineering information possible.

Stable with respect to changes in implementation: Implementation of the runtime and engineering objects can be changed over without having any influence on the mapping and consequently on the way in which the method is carried out.

Non-tool-specific: The upload mechanism can also be used by other tools and not just by the engineering system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for automatic retrieval, in an automation system, of engineering data from a runtime system for an engineering system, and restoring representatives of the automation objects in the engineering system, the automation system including a multiplicity of individual runtime automation objects in the runtime system, the runtime automation objects have no direct reference to any associated engineering objects in the engineering system, the method comprising:
   supplying, by each of the automation objects, an identifying designation of a type of respective representative to the engineering system;
   creating, via the engineering system, said representatives for the designated types and, for each of the representatives, entering a reference to the corresponding automation object;
   reading out each representative read out engineering information from the object into the representative using the reference; and
   restoring each of the representatives by entering said information into itself; wherein
      in a first step for the restoration of device representatives in the engineering system, the method further includes,
         supplying, for devices on which the automation objects run, an identifying designation of a type of respective device representative to the engineering system,
         creating, via the engineering system, corresponding device representatives for the designated types and entering, for each of the device representatives, a reference to the device, and
         having, based upon the reference, each device representative read out engineering information from the device, and
      in a second step for the restoration of representatives of the automation objects in the engineering system, the method further comprises,
         supplying, via the automation objects, an identifying designation of a type of respective representative to the engineering system,
         creating, via the engineering system, corresponding representatives for the designated types and, for each of the representatives, entering a reference to the automation object, and
         having, based upon the reference, each representative read out engineering information from the automation object.

2. The method as claimed in claim 1, wherein, in a third step for the restoration of communication relationships between the representatives of the automation objects in the engineering system, the method further comprises:
   supplying, via the devices, lists with communication relationships to the engineering system,
   converting, in the engineering system, entries of the lists into references to inputs and outputs of the representatives of the automation objects and, subsequently, setting up corresponding connections up in the engineering system.

3. The method as claimed in claim 2, wherein entries in the lists with communication relationships contain sources and drains of the communication relationships, the sources and drains in each case being described by a triple from an identifier of the device, an identifier of the automation object and an identifier of the input or output.

4. The method as claimed in claim 2, wherein both the objects of the engineering system and the objects of the automation system are described by a uniform, executable object model and a direct communication at model level is possible between the objects of the engineering system and the objects of the automation system.

5. The method as claimed in claim 4, wherein entries in the lists with communication relationships contain sources and drains of the communication relationships, the sources and drains in each case being described by a triple from an identifier of the device, an identifier of the automation object and an identifier of the input or output.

6. The method as claimed in claim 1, wherein both the objects of the engineering system and the objects of the automation system are described by a uniform, executable object model and a direct communication at model level is possible between the objects of the engineering system and the objects of the automation system.

7. The method as claimed in claim 6, wherein entries in the lists with communication relationships contain sources and drains of the communication relationships, the sources and drains in each case being described by a triple from an identifier of the device, an identifier of the automation object and an identifier of the input or output.

8. The method as claimed in claim 1, wherein the objects of the automation system have no direct reference to the associated objects of the engineering system, to make it possible for the engineering system and automation system to be separated.

9. The method as claimed in claim 1 wherein, the method is used for the updating of already existing engineering information as a delta method.

10. The method as claimed in claim 9, wherein both the objects of the engineering system and the objects of the automation system are described by a uniform, executable object model and a direct communication at model level is possible between the objects of the engineering system and the objects of the automation system.

11. The method as claimed in claim 10, wherein entries in the lists with communication relationships contain sources and drains of the communication relationships, the sources and drains in each case being described by a triple from an identifier of the device, an identifier of the automation object and an identifier of the input or output.

12. The method of claim 1, wherein the first step for the restoration of device representatives in the engineering system is initiated from a software system.

* * * * *